US012432449B2

United States Patent
Cho et al.

(10) Patent No.: US 12,432,449 B2
(45) Date of Patent: Sep. 30, 2025

(54) ELECTRONIC IMAGE STABILIZATION DEVICE AND METHOD THEREOF

(71) Applicant: MEDIATEK INC., Hsinchu (TW)

(72) Inventors: Meng-Hung Cho, Hsinchu (TW); Hsiao-Wei Chen, Hsinchu (TW); Shu-Fan Wang, Hsinchu (TW); Yu-Chun Chen, Hsinchu (TW); Te-Hao Chang, Hsinchu (TW); Ying-Jui Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 86 days.

(21) Appl. No.: 18/298,428

(22) Filed: Apr. 11, 2023

(65) Prior Publication Data

US 2024/0348921 A1 Oct. 17, 2024

(51) Int. Cl.
*H04N 23/68* (2023.01)
*H04N 23/80* (2023.01)

(52) U.S. Cl.
CPC ....... *H04N 23/683* (2023.01); *H04N 23/6811* (2023.01); *H04N 23/6812* (2023.01); *H04N 23/815* (2023.01)

(58) Field of Classification Search
CPC ............. H04N 23/683; H04N 23/6812; H04N 23/815; H04N 23/6811
See application file for complete search history.

(56) References Cited

U.S. PATENT DOCUMENTS

2017/0034410 A1* 2/2017 Yoo ...................... H04N 23/632

* cited by examiner

*Primary Examiner* — Nicholas G Giles
(74) *Attorney, Agent, or Firm* — McClure, Qualey & Rodack, LLP

(57) ABSTRACT

An image processing device is provided. The device includes an electronic image stabilization (EIS) module and an image signal processing (ISP) module. The EIS module is configured to determine EIS information for a video frame based on motion information that corresponds to the video frame, wherein the EIS information is associated with the target region and the margin region of the video frame. The ISP module is configured to generate a processed video frame based on the EIS information by performing an ISP process only on the target region of the video frame and skipping the ISP process on the margin region of the video frame. The EIS module is further configured to generate a stabilized image based on the EIS information and the processed video frame.

10 Claims, 3 Drawing Sheets

ELECTRONIC IMAGE STABILIZATION DEVICE AND METHOD THEREOF

BACKGROUND OF THE INVENTION

Field of the Invention

The present disclosure relates in general to image processing, and it relates in particular to an image processing method and an image processing device with an intelligent electronic image stabilization technique for improving system power efficiency.

Description of the Related Art

Electronic image stabilization (EIS) is an image enhancement technique to compensate for the motion of a device, such as camera jitters caused by an unsteady hand. The technique uses the margin region of the input image as a buffer for motion compensation. The EIS process will abandon the margin region of the input image, and retain the region (hereinafter referred to as "target region") surrounded by the margin region. In the prior art, since the EIS process determine the target region of an image based on the image itself, an image signal processing (ISP) process must be performed on the whole input image before the EIS process. This means that some of the pixels of the input image (i.e., the pixels in the margin region) being processed during the ISP process will be abandoned in the EIS process. In other words, all previous ISP processes performed on the pixels of the margin region are in vain, as these pixels will be abandoned anyway. In recent years, with the improvement of image quality and the popularity of recording, issues related to image stability and power consumption have emerged.

Therefore, it is desirable to have a solution for image processing with ISP and EIS processes which generates high-quality and stable image sequences, and further avoids the redundant computation of the ISP.

BRIEF SUMMARY OF THE INVENTION

An embodiment of the present disclosure provides an image processing device. The device includes an electronic image stabilization (EIS) module and an image signal processing (ISP) module. The EIS module is configured to determine EIS information for a video frame based on motion information that corresponds to the video frame, wherein the EIS information is associated with the target region and the margin region of the video frame. The ISP module is configured to generate a processed video frame based on the EIS information by performing an ISP process only on the target region of the video frame and skipping the ISP process on the margin region of the video frame. The EIS module is further configured to generate a stabilized image based on the EIS information and the processed video frame.

In an embodiment, the target region is distorted. The EIS information includes a warp map. The EIS module generates the stabilized image by mapping pixels in the target region of the processed video frame to corresponding pixels of the stabilized image based on the warp map. In another embodiment, the target region is rectangular. The EIS information includes cropping information. The EIS module generates the stabilized image by removing the margin region from the processed video frame based on the cropping information.

In an embodiment, the EIS module is further configured to obtain the motion information from a gyroscope. In another embodiment, the EIS module is further configured to estimate the motion information using a motion estimation algorithm, based on the video frame and a previous video frame in a video-frame sequence.

An embodiment of the present disclosure provides an image processing method implemented by the image processing device. The method includes the step of determining EIS information for a video frame based on motion information that corresponds to the video frame. The EIS information is associated with the target region and the margin region of the video frame. The method further includes the step of generating a processed video frame based on the EIS information by performing an ISP process only on the target region and skipping the ISP process on the margin region. The method further includes the step of generating a stabilized image based on the EIS information and the processed video frame.

In an embodiment, the target region is distorted. The EIS information includes a warp map. The step of generating the stabilized image based on the EIS information and the processed video frame includes mapping pixels in the target region of the processed video frame to corresponding pixels of the stabilized image based on the warp map.

In an embodiment, the target region is rectangular. The EIS information includes cropping information. The step of generating the stabilized image based on the EIS information and the processed video frame comprises: removing the margin region from the processed video frame based on the cropping information.

In an embodiment, the method further includes the step of obtaining the motion information from a gyroscope.

In an embodiment, the method further includes the step of estimating the motion information using a motion estimation algorithm, based on the video frame and a previous video frame in a video-frame sequence.

The present disclosure provides a solution for image processing that maximizes the power efficiency of devices during image sequence/video acquisition. By skipping most image processing computation for the abandoned region, the power consumption can be minimized.

BRIEF DESCRIPTION OF THE DRAWINGS

The present disclosure can be more fully understood by reading the subsequent detailed description and examples with references made to the accompanying drawings. Additionally, it should be appreciated that in the flow diagram of the present disclosure, the order of execution for each blocks can be changed, and/or some of the blocks can be changed, eliminated, or combined.

DETAILED DESCRIPTION OF THE INVENTION

The following description is made for the purpose of illustrating the general principles of the invention and should not be taken in a limiting sense. The scope of the invention is best determined by reference to the appended claims.

In each of the following embodiments, the same reference numbers represent identical or similar elements or components.

Ordinal terms used in the claims, such as "first," "second," "third," etc., are only for convenience of explanation, and do not imply any precedence relation between one another.

The description for the embodiments the image processing method is also applicable to the embodiments of the image processing device, and vice versa.

The present disclosure aims to provide a solution for image processing with ISP and EIS process which generates high-quality and stable image sequence, and further avoids the redundant computation during the ISP process. The basic function of EIS will be introduced with reference to FIG. 1.

Figure 1:
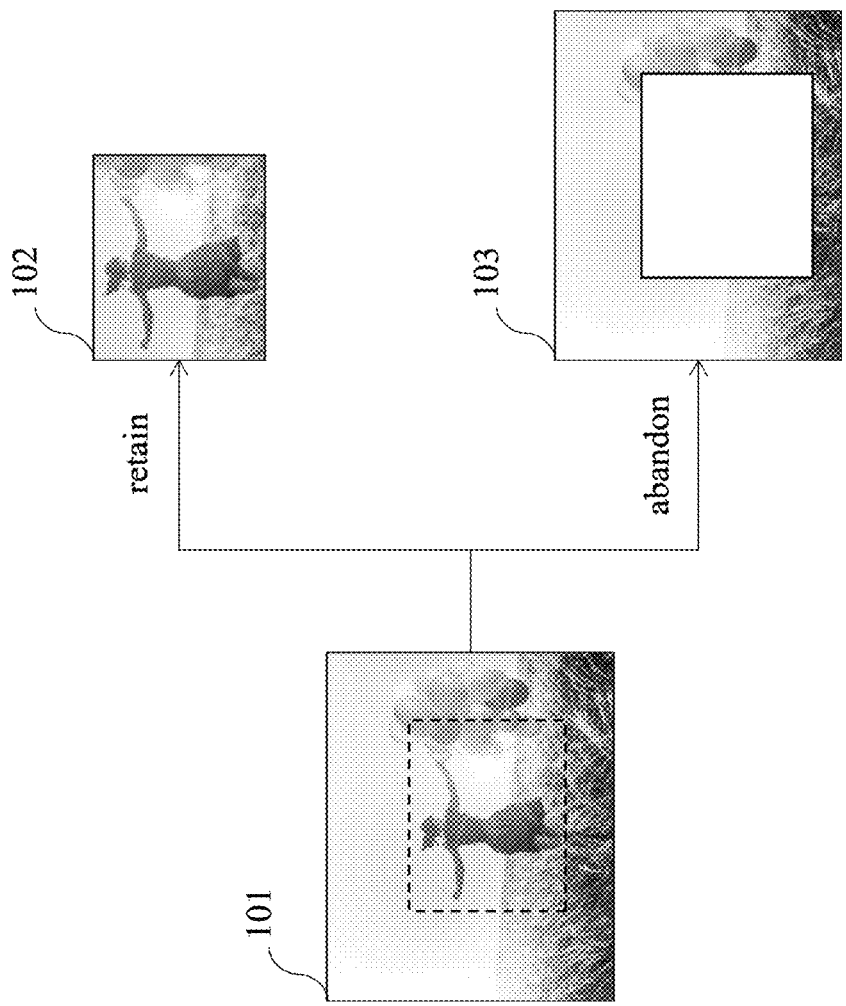
FIG. 1 is a schematic diagram illustrating the basic function of EIS process.

FIG. 1 is a schematic diagram illustrating the basic function of EIS process 10. As shown in FIG. 1, the EIS process 10 retains the target region 102 of the input image 101 and abandons the margin region 103 that surrounds the target region 102 in the input image 101. Optionally, the retained target region 102 may be resized to the same size and/or resolution with the input image 101, though not shown in FIG. 1.

In practice, the input image 101 is a video frame in a video (i.e., a sequence of video frames) obtained from an image sensor. The content of each video frame is the field of view (FOV) of the image sensor at a certain time point. When the image sensor has motions, the content of the input image 101 changes as the FOV of the image sensor changes. The target region 102 can be a region contained in several consecutive video frames, which is probably the part of the FOV that may interests the viewer. The position of the target region 102 in the image 101 is associated with the motion of device.

A larger margin region 103 (i.e., smaller target region 102) leads to better stability of the output frames sequence, but at the same time it means more pixels of the input image 101 (i.e., the pixels in the margin region 103) are abandoned during the EIS process 10. All previous ISP process performed on the pixels of the margin region is in vain as these pixels will be abandoned anyway. Therefore, a larger margin region 103 also leads to more redundant processing and more non-necessary computing resources wasted.

In an embodiment, the target of image processing by the ISP process is the target region 102 instead of the input image 101. In other words, the ISP process starts processing only after the EIS process 10 has completed and outputted the target region 102. The advantage of this embodiment is that the ISP process will not process the abandoned region 103, thus saving computing resources. However, the delay caused by waiting for the EIS process 10 to complete may impact performance to some extent.

Figure 2:
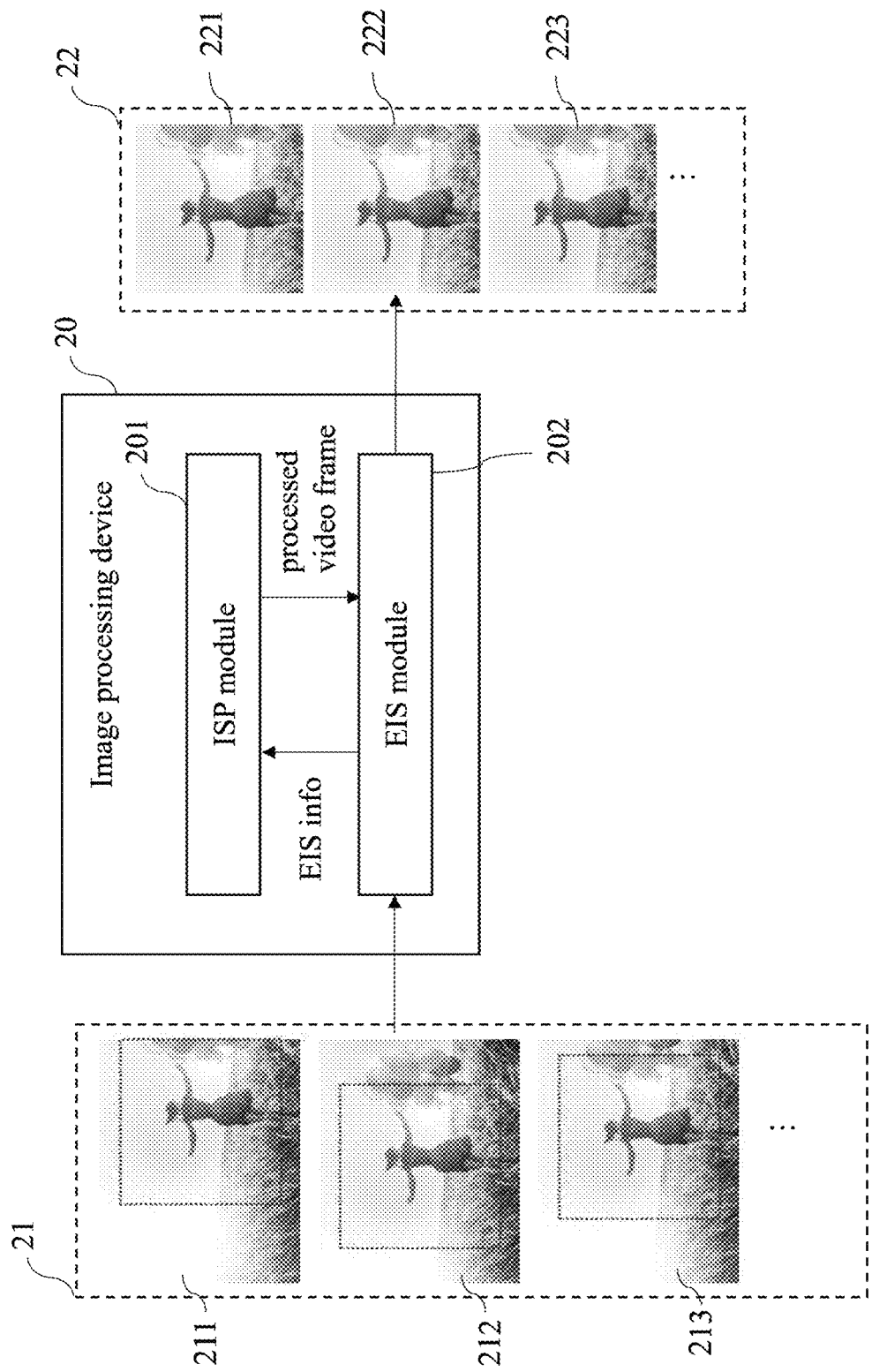
FIG. 2 illustrates the architecture of an image processing device, according to an embodiment of the present disclosure.

FIG. 2 illustrates the architecture of an image processing device 20, according to an embodiment of the present disclosure. As shown in FIG. 2, the image processing device 20 includes an ISP module 201 and an EIS module 202. The image processing device 20 receives a video fame sequence 21 (including video fame 211, 212, 213, etc.) as input, and output the stabilized image sequence 22 (including stabilized image 221, 222, 223, etc.).

The image processing device 20 can be installed in an electronic device (though not shown in FIG. 2) with photography and imaging functions, such as a variety of cameras and mobile devices. Besides the image processing device 20, the electronic device may further include the image sensor described above. The image sensor can be implemented by, for example, a charge-coupled device (CCD) or a complementary metal-oxide-semiconductor (CMOS), to convert the optical signal received from a plurality of lenses into electrical signals.

The image processing device 20 as such can be a general-purpose processing unit or special-purpose hardware circuitry. In an embodiment, the image processing device 20 can be a general-purpose processor, a microprocessor, or a microcontroller loading a program or an instruction set from a storage unit (including volatile and non-volatile memories) of the electronic device to implement the features of the ISP module 201 and the EIS module 202. In another embodiment, the image processing device 20 may include one or more integrated circuits, such as application-specific integrated circuits (ASIC) and/or field programmable gate arrays (FPGA), dedicated to implement the ISP module 201 and the EIS module 202.

The EIS module 202 is configured to determine EIS information for the video frame 212 based on motion information that corresponds to the video frame 212, and pass the EIS information to the ISP module 201. The EIS information is associated with the target region and the margin region of the video frame 212. The ISP module 201 is configured to generate a processed video frame based on the EIS information by performing an ISP process (e.g., demosaicing, noise reduction, edge enhancement, etc., but the present disclosure is not limited thereto) only on the target region of the video frame and skipping the ISP process on the margin region of the video frame 201, and pass the processed video frame to the EIS module 202. Then, EIS module 202 generates the stabilized image 222 based on the EIS information and the processed video frame.

Similarly, the stabilized image 223 will be generated by the image processing device 20 based on the input video frame 213 in the same way as the stabilized image 222.

In an embodiment, the electronic device in which the image processing device 20 is installed is a fisheye camera or similar photographic device that has lenses producing strong visual distortion intended to capture images with wide range of view. Thus, the video frames in the video fame sequence 21 are distorted. Since the ISP process does not cope with the distortion, the target region of each processed video frame is distorted, too. In this embodiment, the EIS information includes a warp map that records the mappings between the coordinates of the pixels in the target region of the processed video frame and the coordinates of the pixels in the stabilized image. Thereby, the EIS module generates the stabilized image by mapping pixels in the target region of the processed video frame to corresponding pixels of the stabilized image based on the warp map.

In another embodiment, the video frames in the video fame sequence 21 are rectangular, and so is the target region of each processed video frame. In this embodiment, the EIS information includes cropping information. The cropping information can include the combination of the coordinates of the four vertices of the target region, the combination of the coordinates of the upper-left vertex and lower-right vertex of the target region, the combination of the coordinates of bottom-left vertex and top-right vertex of the target region, the combination of the coordinate of one vertex and scale (including length and width) of the target region, or any combination of information regarding the rectangular target region that can indicate the target region and the margin region. Thereby, the EIS module generates the stabilized image by removing the margin region from the processed video frame based on the cropping information.

In an embodiment, the EIS module and the ISP module are configured to determine the EIS information and perform the ISP process simultaneously. In other words, the ISP module 201 does not need to wait for the EIS module 202 to complete the determination of the EIS information.

Figure 3:
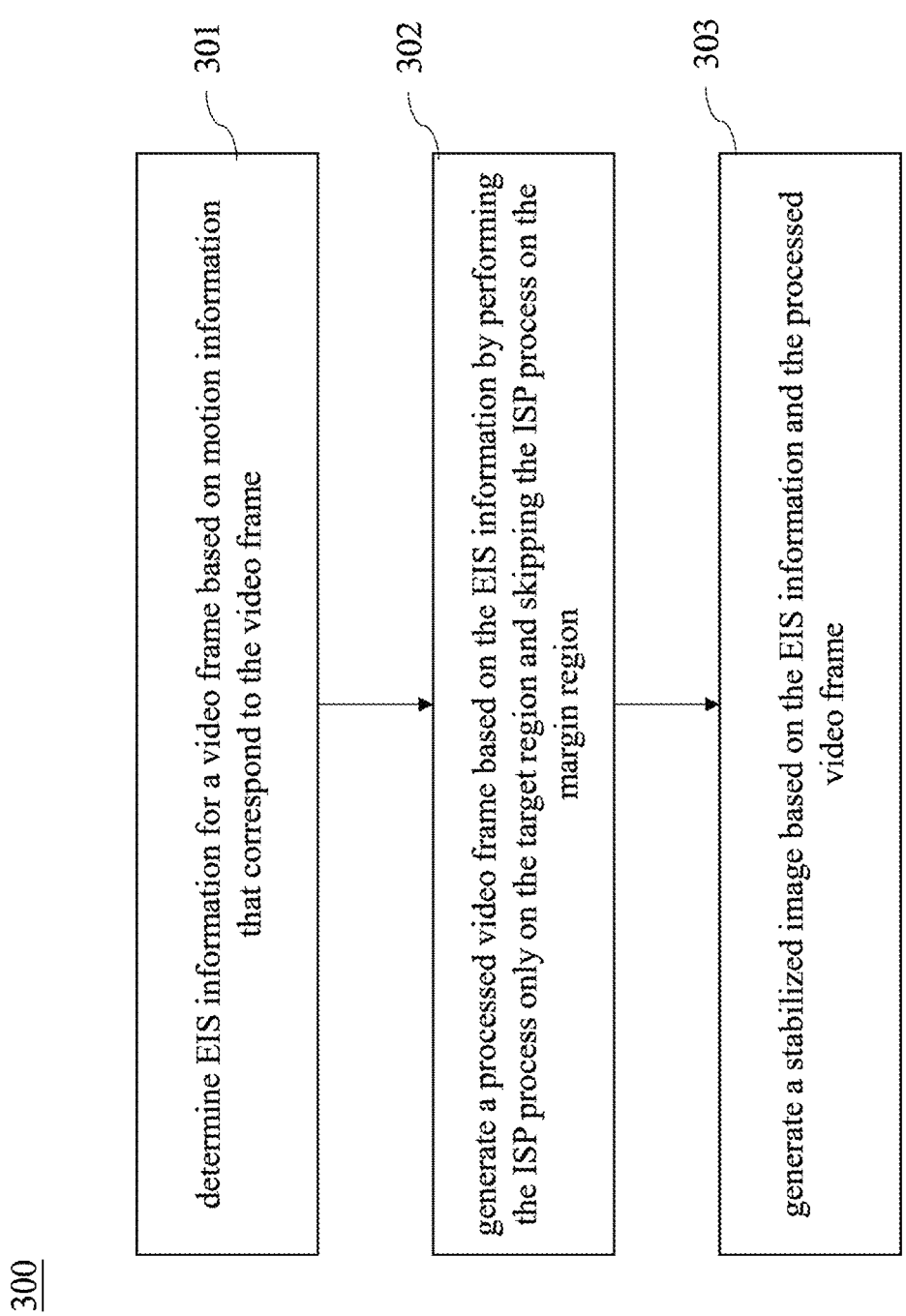
FIG. 3 is the flow diagram illustrating an image processing method implemented by the image processing device, according to an embodiment of the present disclosure.

FIG. 3 is the flow diagram illustrating an image processing method 300 executed by the image processing device 20, according to an embodiment of the present disclosure. As shown in FIG. 3, the method 300 includes steps 301-303.

In step 301, EIS information for a video frame is determined based on motion information that corresponds to the video frame. The EIS information is associated with the target region and the margin region of the video frame. Then, the method 300 proceeds to step 302.

In step 302, a processed video frame is generated based on the EIS information by performing the ISP process (e.g., demosaicing, noise reduction, edge enhancement, etc., but the present disclosure is not limited thereto) only on the target region and skipping the ISP process on the margin region. Then, the method 300 proceeds to step 303.

In step 303, a stabilized image is generated based on the EIS information and the processed video frame.

In an embodiment, the target region is distorted, and the EIS information includes a warp map. In this embodiment, pixels in the target region of the processed video frame are mapped to corresponding pixels of the stabilized image based on the warp map in step 303.

In an embodiment, the target region is rectangular, and the EIS information includes cropping information. In this embodiment, the stabilized image is generated by removing the margin region from the processed video frame based on the cropping information in step 303.

In an embodiment, the method further includes the step of obtaining the motion information from a gyroscope. The motion information obtained from the gyroscope can be in the form of vectors, but the present disclosure is not limited thereto.

In an embodiment, the method further includes the step of using a motion estimation algorithm (e.g., block-matching algorithm, phase correlation and frequency domain method, pixel recursive algorithm, etc., but the present disclosure is not limited thereto) to estimate the motion information based on the video frame (e.g., the video frame 212) and a previous video frame (e.g., the video frame 211) in a video-frame sequence.

The present disclosure provides a solution for image processing that maximizes the power efficiency of devices during image sequence/video acquisition. By skipping most image processing computation for the abandoned region, the power consumption can be minimized.

The above paragraphs are described with multiple aspects. Obviously, the teachings of the specification may be performed in multiple ways. Any specific structure or function disclosed in examples is only a representative situation. According to the teachings of the specification, it should be noted by those skilled in the art that any aspect disclosed may be performed individually, or that more than two aspects could be combined and performed.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image processing device, comprising:
   an electronic image stabilization (EIS) module, configured to determine EIS information for a video frame based on motion information that corresponds to the video frame, wherein the EIS information is associated with a target region and a margin region of the video frame; and
   an image signal processing (ISP) module, configured to generate a processed video frame based on the EIS information by performing an ISP process only on the target region of the video frame and skipping the ISP process on the margin region of the video frame, wherein the ISP process includes at least one of demosaicing, noise reduction, and edge enhancement;
   wherein the EIS module is further configured to generate a stabilized image based on the EIS information and the processed video frame;
   wherein the EIS information includes cropping information; and
   wherein the EIS module generates the stabilized image by removing the margin region from the processed video frame based on the cropping information.

2. The device as claimed in claim 1, wherein the target region is distorted;
   wherein the EIS information includes a warp map; and
   wherein the EIS module generates the stabilized image by mapping pixels in the target region of the processed video frame to corresponding pixels of the stabilized image based on the warp map.

3. The device as claimed in claim 1, wherein the target region is rectangular.

4. The device as claimed in claim 1, wherein the EIS module is further configured to obtain the motion information from a gyroscope.

5. The device as claimed in claim 1, wherein the EIS module and the ISP module are configured to determine the EIS information and perform the ISP process simultaneously.

6. An image processing method, implemented by an image processing device, the method comprising:
   determining electronic image stabilization (EIS) information for a video frame based on motion information that corresponds to the video frame, wherein the EIS information is associated with the target region and the margin region of the video frame;
   generating a processed video frame based on the EIS information by performing an image signal processing (ISP) process only on the target region and skipping the ISP process on the margin region, wherein the ISP process includes at least one of demosaicing, noise reduction, and edge enhancement; and
   generating a stabilized image based on the EIS information and the processed video frame;
   wherein the EIS information includes cropping information; and
   wherein the step of generating the stabilized image based on the EIS information and the processed video frame comprises: removing the margin region from the processed video frame based on the cropping information.

7. The method as claimed in claim 6, wherein the target region is distorted;
   wherein the EIS information includes a warp map; and
   wherein the step of generating the stabilized image based on the EIS information and the processed video frame comprises: mapping pixels in the target region of the processed video frame to corresponding pixels of the stabilized image based on the warp map.

8. The method as claimed in claim 6, wherein the target region is rectangular.

9. The method as claimed in claim 6, further comprising: obtaining the motion information from a gyroscope.

10. The method as claimed in claim 6, further comprising:
   estimating the motion information using a motion estimation algorithm, based on the video frame and a previous video frame in a video-frame sequence.

* * * * *